United States Patent [19]

Riesenberg

[11] 3,910,648
[45] Oct. 7, 1975

[54] APPARATUS FOR THE PREVENTION OF WHEEL LOCKING IN MOTOR VEHICLES

[75] Inventor: Klaus-Otto Riesenberg, Ludwigsburg-Ossweil, Germany

[73] Assignee: Robert Bosch G.m.b.H., Stuttgart, Germany

[22] Filed: Apr. 30, 1974

[21] Appl. No.: 465,496

[52] U.S. Cl. ............ 303/21 F; 188/106 P; 188/345; 303/6 R; 303/10; 303/21 AF
[51] Int. Cl.² ...................... B60T 8/06; B60T 13/16
[58] Field of Search ........ 303/21 F, 21 AF, 6 R, 10, 303/61–63, 68–69, 13; 188/181 A, 181 R, 106 P, 345

[56] References Cited
UNITED STATES PATENTS

| | | | |
|---|---|---|---|
| 3,414,336 | 12/1968 | Atkin et al. | 303/21 F |
| 3,466,098 | 9/1969 | Pieren et al. | 303/21 F |
| 3,606,488 | 9/1971 | Beuchle et al. | 303/21 F |
| 3,608,979 | 9/1971 | Coyle | 303/21 F UX |
| 3,674,317 | 7/1972 | Mangold | 303/21 AF X |
| 3,684,328 | 8/1972 | Koivuner | 303/21 F X |
| 3,702,713 | 11/1972 | Oberthur | 303/21 F |
| 3,788,710 | 1/1974 | Grunberg et al. | 303/21 F |
| 3,813,130 | 5/1974 | Inada | 303/21 F |

Primary Examiner—Trygve M. Blix
Assistant Examiner—Douglas C. Butler
Attorney, Agent, or Firm—Edwin E. Greigg

[57] ABSTRACT

An improved wheel lock prevention apparatus for motor vehicles of the two circuit braking system kind. The system includes a pressure transducer for each circuit and two groups of pressure receivers, a wheel lock prevention is located, a reduction valve and a switching valve. As improved, the electromagnetic valve pair controls the two circuits by controlling the pressure medium of a first one of the circuits, with this pressure medium serving to actuate the switching valve which, in turn, is also connected to a second one of the circuits. With this improved apparatus, when the pressure in the second circuit is low with respect to the pressure in the first circuit, the switching valve closes the passage through the second circuit, and when the pressure in the second circuit is high with respect to the pressure in the first circuit, the switching valve opens a passage through the second circuit.

5 Claims, 4 Drawing Figures

APPARATUS FOR THE PREVENTION OF WHEEL LOCKING IN MOTOR VEHICLES

BACKGROUND OF THE INVENTION

The present invention relates to an apparatus for the prevention of wheel locking in motor vehicles, and, more particularly, to an apparatus for the prevention of wheel locking in motor vehicles having a dual circuit braking system with one braking pressure transducer for each circuit and two groups of braking pressure receivers. The system also has a valve assembly for the prevention of wheel locking, sensors at the vehicle wheels and an electronic control apparatus which processes the sensed signals and transmits them to the valve assembly. There is provided within the valve assembly an electromagnetic valve pair (inlet and outlet) and at least one reduction valve. The inlet and outlet of the electromagnetic valve pair can be connected to a control volume of the reduction valve.

An apparatus of this type is known. In the known apparatus, two magnetic valves, an inlet valve and an outlet valve, are provided both in the front axle brake circuit as well as in the rear axle brake circuit; and by means of these valves, the braking pressure during wheel locking is regulated. In an embodiment already adopted in actual practice, where the front axle brake is embodied as a dual brake having two brake cylinders and two braking circuits for each vehicle wheel, twelve electromagnetic valves would be required.

OBJECTS AND SUMMARY OF THE INVENTION

It is, therefore, an object of the present invention to provide an improved wheel lock prevention apparatus for motor vehicles.

It is a more specific object of the present invention to provide an improved wheel lock prevention apparatus for motor vehicles having a two circuit braking system wherein the number of electromagnetic valves is significantly reduced.

These and other objects of the present invention are accomplished by the inclusion of a switching valve which is connected to a second one of the two braking circuits and with a single pair of electromagnetic valves which control the two circuits by controlling the pressure medium of the first one of the two braking circuits and by having the pressure medium in the first circuit actuate the switching valve. With this arrangement, when the pressure in the second braking circuit is low with respect to the pressure in the first braking circuit the switching valve closes the passage through the second braking circuit and when the pressure in the second braking circuit is high with respect to the pressure in the first braking circuit, the switching valve opens a passage through the second circuit.

DESCRIPTION OF THE PREFERRED EMBODIMENTS

Figure 1:
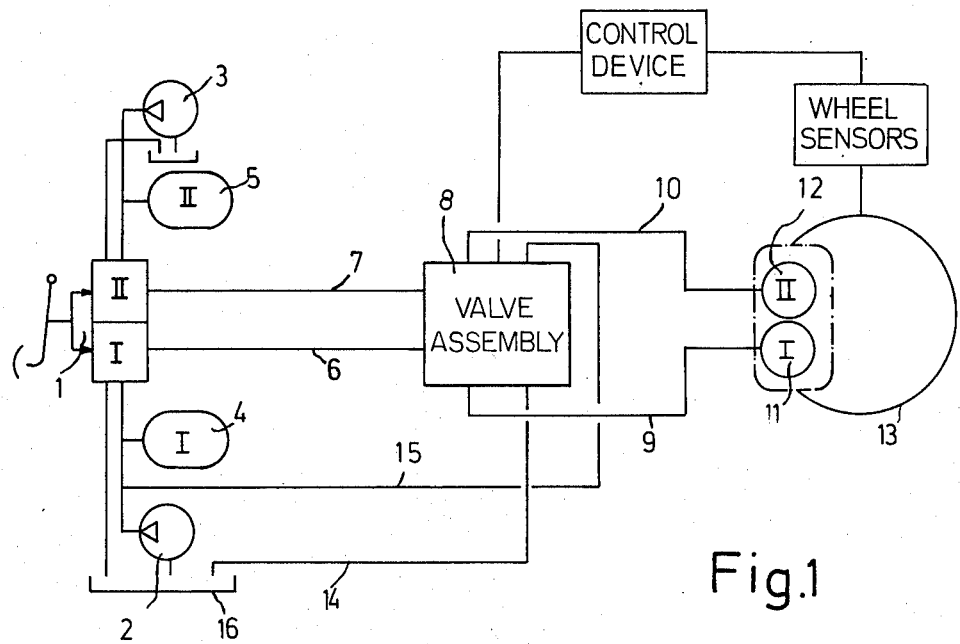
FIG. 1 illustrates a schematic circuit diagram for a two circuit externally powered braking system.

Turning now to FIG. 1, a two circuit (I and II), externally powered brake is shown having a two circuit brake valve 1, through which pressure fluid is delivered into two brake lines 6 and 7. The pressure fluid is derived from containers 4 and 5 and is delivered from these containers 4 and 5 through the valve 1 by pumps 2 and 3, respectively. The two brake lines 6 and 7 lead to a wheel lock prevention valve assembly 8 and further through two brake lines 9 and 10 to two brake cylinders 11 and 12 which are located at a common braking disc 13 of a wheel brake. Also connected to valve assembly 8 are two lines 14 and 15; line 14 leads to a fluid reservoir 16 and line 15 leads to the connection between the pump 2 and the storage container 4.

Included in brake circuit I is the pump 2, the storage container 4, the two-circuit brake valve 1 and the brake lines 6 and 9, whereas included in brake circuit II are the pump 3, the storage container 5, the two-circuit braking valve 1, and the lines 7 and 10.

Figure 2:
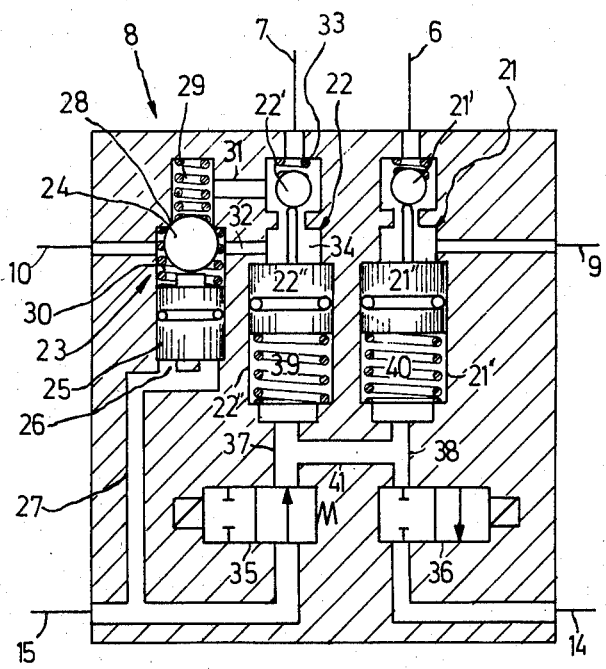
FIG. 2 is a cross-sectional view of a wheel lock prevention valve assembly included in the circuit of FIG. 1.

FIG. 2 shows how the brake circuits I and II lead through the valve assembly 8. It will be seen that brake circuit I leads from line 6 through a reduction valve 21 to line 9. The reduction valve 21 includes a closure element 21' and an actuating piston 21''. Brake circuit II leads from line 7 to line 10 and also through a reduction valve 22 consisting of a closure elements 22' and an actuating piston 22''. Associated with the reduction valve 22, downstream thereof, is a switching valve 23 consisting of a closure element 24 and a piston 25. The closure element 24 can control the passage through the brake circuit II. The piston 25 is acted upon by the storage pressure in brake circuit I by means of a connection between a working chamber 26 of the piston 25 and line 15. The connection is provided by a channel 27. The closure element 24 is so disposed that when the storage pressure in brake circuit I is high, it is pushed by piston 25 against a valve seat 28 to form a seal; but when the pressure in brake circuit II is predominant, it disengages its seat 28 and opens.

Two chambers 29 and 30 of the switching valve 23 are connected through channels 31 and 32, respectively to two chambers 33 and 34 of the reduction valve 22. The chambers 29 and 30 and 33 and 34 are disposed in such a way that, as seen in the direction of brake actuation, the chambers 29 and 33 are located upstream of the closure elements 24 and 22', respectively; and the chambers 30 and 34 are located downstream of the closure elements 24 and 22', respectively.

The valve assembly 8 also includes two 2/2 electromagnetic valves 35 and 36 of which the valve 35 operates as an inlet valve and the valve 36 operates as an outlet valve. The magnetic valve pair 35/36 controls a channel connection 37, 38, 41 from line 15 to the line 14, with the line 14 being, as stated above, connected to the fluid reservoir 16. Connected to the magnetic valve pair 35/36 through the channels 37 and 38, respectively, are control volumes 39 and 40 which are disposed below the actuation pistons 22'' and 21'' of the reduction valves 22 and 21. The two channels 37 and 38 communicate with one another through the transverse channel 41.

The wheel lock prevention apparatus described above operates as follows:

When the brake is released, the valves within the wheel lock prevention valve assembly 8 assume the position shown in FIG. 2, i.e. the two reduction valves 21 and 22 are open due to the fact that the storage pressure of brake circuit I is admitted through magnetic valve 35 to the control volumes 39 and 40, and the switching valve 23 is closed, also due to the storage pressure in brake circuit I.

When the two circuit braking valve 1 is actuated, brake fluid in brake circuit I travels through the line 6, the open reduction valve 21 and through the line 9 to the brake cylinder 11. Within brake circuit 11, brake fluid flows through the linee 7 to the reduction valve 22, reaches the chamber 34 and from there flows through the channel 32 into the chamber 30 and further through the line 10 into the brake cylinder 12.

However, if the brake system pressure exceeds a wheel lock limiting value, the magnetic valve pair 35/36 is switched over by a sensing device and a control device. The storage pressure of brake circuit I is closed off, and the control volumes 39 and 40 are pressure-relieved through the line 14 toward the reservoir 16. The closure elements 21' and 22' close off the brake line passage. The brakes are released so that the danger of wheel lock is removed. Subsequently, the reduction valves 21 and 22 resume their initial position.

In this way the electromagnetic valve pair 35/36 controls both brake circuits I and II and prevents wheel locking in both brake circuits. The brake fluid controlled by the magnetic valve pair 35/36 derives from brake circuit I and, in addition, actuates the switching valve 23 which, together with its closure element 24, is located in brake circuit II. When the pressure in brake circuit II is low with respect to the pressure in brake circuit I, the switching valve 23 closes and when the pressure in brake circuit II is high with respect to the pressure in brake circuit I, the switching valve 23 opens.

If the storage pressure in brake circuit I fails, then both reduction valves 21 and 22 close. In the failed brake circuit I, braking is no longer possible. Brake circuit II however remains operational, because the volume 26 is pressure-relieved and the switching valve 23 opens. In that case, brake fluid in brake circuit II can flow from the chamber 33 through the channel 31 into the chamber 29 and from there through the open switching valve 23 into the brake line 10. Actually, the switching valve 23 is already actuated when the supply pressure in circuit I falls below the brake pressure regulated within brake circuit II. The onset pressure for switching valve 23 can be pre-set by appropriate dimensioning of the active surfaces of the closure element 24 and of the piston 25. When the brake is released, fluid flows through the channel 32, past the closure element 22' which lifts off from its seat in the manner of a check valve and back to the brake valve 1.

When brake circuit II fails, brake circuit I remains unaffected. In the same way, the above-described wheel lock prevention valve assembly 8 can be utilized in a braking system wherein the wheels on one axle are assigned to different brake circuits, but share a common wheel lock prevention regulation.

Figure 3:
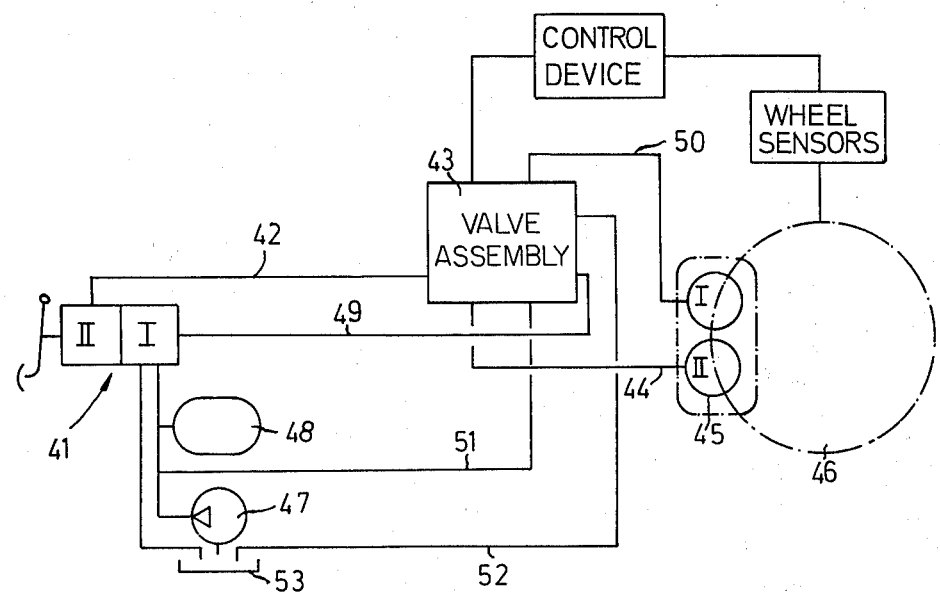
FIG. 3 illustrates a schematic circuit diagram for a combined two circuit auxiliary-power external-power braking system.

In a combined two-circuit auxiliary-power external-power braking system as shown in FIG. 3, the brake circuit II, acting as an auxiliary-power brake, is equipped with a main cylinder and the brake circuit I is equipped as an external-power brake. The main cylinder of a tandem brake valve 41 is connected through a brake line 42 to a wheel lock prevention valve assembly 43. Beyond valve assembly 43, line 42 is continued as brake line 44 which leads to a brake cylinder 45 located at a brake disc 46. Thus this brake circuit II is the auxiliary-power brake circuit.

A second valve member of the tandem brake valve 41 is connected to a pump 47 and a pressure storage container 48. A brake line 49, supplied by the pump 47 and the pressure storage container 48, leads to the valve assembly 43 and is continued beyond the valve assembly 43 in a brake line 50. There is connected to the valve assembly 43 a pressure line 51 leading to the connection between the pump 47 and the pressure storage container 48. Finally, there is also provided a return line 52 terminating in a fluid reservoir 53.

Figure 4:
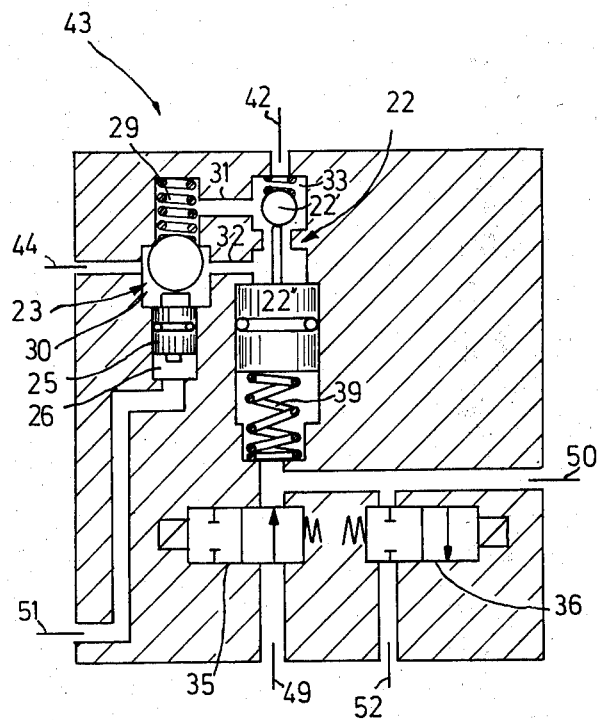
FIG. 4 is a cross-sectional view of a wheel lock prevention valve assembly included in the circuit of FIG. 3.

The valve assembly 43 is shown in section in FIG. 4. It may be seen that it is largely constructed in the same way as the valve assembly 8 of FIG. 2, with the exception that it is equipped with only one reduction valve. For this reason, parts of FIG. 4 which correspond to those of FIG. 2 are provided with the same reference numerals.

On that side of the reduction valve 22 which contains the closure element, the chamber 33 is connected to the brake line 42 of brake circuit II. The brake fluid for brake circuit II leaves the valve assembly 43 through chamber 30 of the switching valve 23. Below the switching piston 25 of the switching valve 23, the prevailing pressure is that of line 51 and, during braking, the control volume 39 and the brake line 50 connected thereto experience brake pressure through brake line 49 and through the magnetic valve pair 35/36. When the wheel lock prevention is actuated, the control volume 39 and the brake line 50 connected thereto experience relief pressure through the return line 52. The brake circuit I is led through the reduction valve 22 on the side containing the reduction piston 22''.

The process of braking occurs in this embodiment in such a way that braking in brake circuit II occurs through the reduction valve 22 and through the channel 32 and the chamber 30 of the normally closed switching valve 23; whereas in brake circuit I, braking occurs through the open inlet valve 35 of magnetic valve pair 35/36. When the wheel lock prevention is active, brake circuit II is also affected by the magnetic valve pair 35/36 of brake circuit I.

When the auxiliary-power brake circuit II fails, brake circuit I remains unaffected.

If the storage pressure in the auxiliary-power brake circuit I fails, reduction valve 22 closes. Nevertheless, the braking system within the intact brake circuit II remains operational, because volume 26 in switching valve 23 is also pressure-relieved and the switching valve 23 opens. Brake fluid within brake circuit II can then flow from the chamber 33 through the channel 31 into the chamber 29 and from there through the open switching valve 23 into the brake line 44. When the brake is released, fluid flows through the channel 32 past the closure element 22', which lifts from its seat in the manner of a check valve, and back to the brake valve 41.

That which is claimed is:

1. In a wheel lock prevention apparatus for motor vehicles having a first and second braking circuit forming part of a two circuit braking system, with a pressure transducer for each circuit and two groups of pressure receivers, the system further including a wheel lock prevention valve assembly connected to said circuits, vehicle wheel sensors connected to said valve assembly, and an electronic control device connected to said sensors and said valve assembly, said control device processes the signals sensed by the sensors and transmits them to the valve assembly, said valve assembly including therein at least one reduction valve having a control volume and an electromagnetic valve pair connectible with the control volume of the reduction valve and serving as an inlet and outlet valve for the control volume of the reduction valve, the improvement comprising a switching valve connected to said second braking circuit and to a pressure medium within said first braking circuit and means connecting said electromagnetic valve pair to the pressure medium within said first braking circuit, wherein the electromagnetic valve pair controls the two braking circuits by controlling the pressure medium of the first braking circuit, which pressure medium actuates said switching valve, wherein when the pressure in said second braking circuit is low with respect to the pressure in said first braking circuit, said switching valve closes the passage through said second braking circuit, and wherein when the pressure in said second braking circuit is high with respect to the pressure in said first braking circuit, said switching valve opens a passage through said second braking circuit.

2. The wheel lock prevention apparatus as defined in claim 1, wherein said switching valve includes a closure element and a piston which actuates said closure element, said closure element controlling the passage through said second braking circuit.

3. The wheel lock prevention apparatus as defined in claim 1, wherein the system includes two reduction valves connected to respective ones of the braking circuits and to said magnetic valve pair, wherein each braking circuit is controlled by one of said reduction valves, said reduction valves cooperating with said magnetic valve pair, and wherein said switching valve is disposed behind said reduction valve which controls said second braking circuit.

4. The wheel lock prevention device as defined in claim 3, wherein each of said reduction valves has an actuating piston which experiences the same pressure through said magnetic valve pair.

5. The wheel lock prevention apparatus as defined in claim 1, wherein said reduction valve has a closure element and a piston, wherein said second braking circuit is led through said reduction valve at the side of said closure element, and wherein said first braking circuit is led through said reduction valve at the side of said control volume.

* * * * *